United States Patent [19]
Woodriff et al.

[11] 3,824,016
[45] July 16, 1974

[54] COMBINED SAMPLE COLLECTION AND VAPORIZATION SYSTEM FOR SPECTRO-CHEMICAL ANALYSIS

[76] Inventors: Ray A. Woodriff, 521 W. Grant St.; Jerome F. Lech, 305 N. Montana Ave., both of Bozeman, Mont. 59715

[22] Filed: June 16, 1972

[21] Appl. No.: 263,623

[52] U.S. Cl............ 356/85, 356/36, 356/74
[51] Int. Cl............................. G01j 3/30
[58] Field of Search........... 356/36, 74, 85, 86, 87; 55/72, 74

[56] References Cited
UNITED STATES PATENTS

| | | | |
|---|---|---|---|
| 2,062,929 | 12/1936 | Powers | 356/246 |
| 3,281,596 | 10/1966 | Williston | 356/36 |
| 3,558,227 | 1/1971 | Tlalka | 356/86 |
| 3,591,289 | 7/1971 | Donega et al. | 356/85 |
| 3,693,323 | 9/1972 | Gant | 55/72 |

OTHER PUBLICATIONS

Qualitative Analysis of Precipitates... Filter Method; Applied Spectroscopy; Vol. 24 No. 6; Nov., Dec. 1970, pg. 613–614.

"A.... Furnace ....;" Woodriff; Applied Spectroscopy; Vol. 24 No. 5; Sept/00T 70; pg. 530–533.

*Primary Examiner*—Vincent P. McGraw
*Attorney, Agent, or Firm*—Fitch, Even, Tabin & Luedeka

[57] ABSTRACT

A porous spectroscopic sample holder is used for collection of a trace element in a fluid medium and the trace element is then vaporized directly from the sample holder. Measurement of the trace element is preferably accomplished by a nonflame atomic absorption method through electrothermal atomization.

14 Claims, 12 Drawing Figures

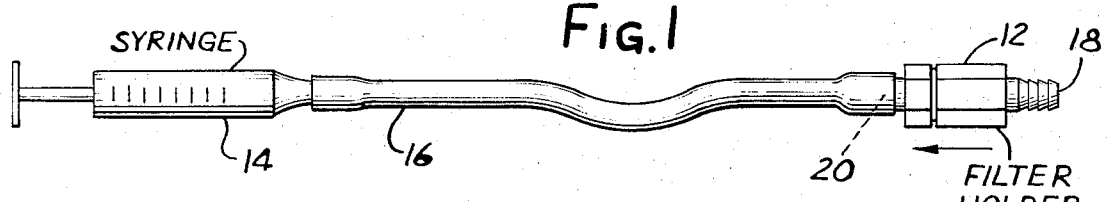
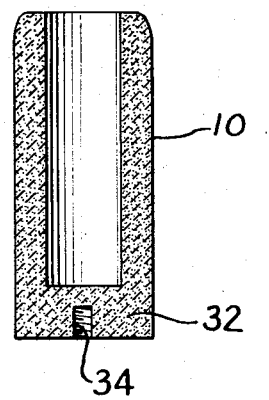
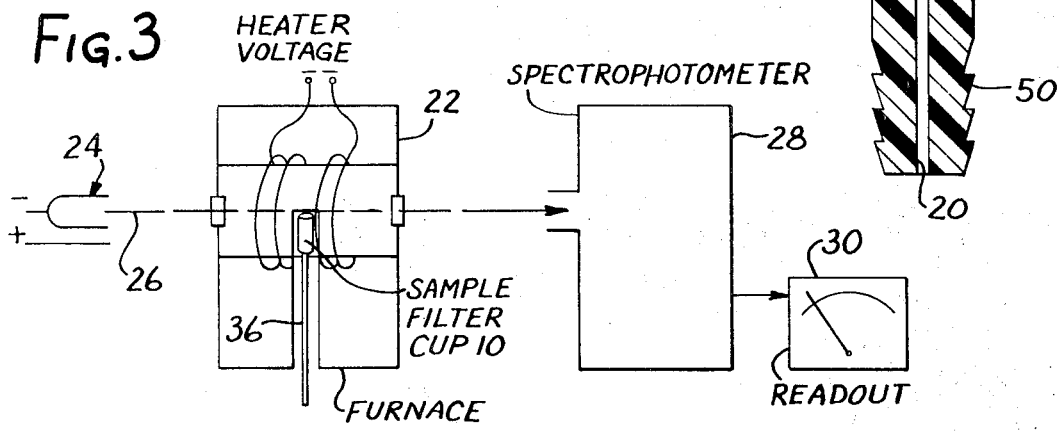
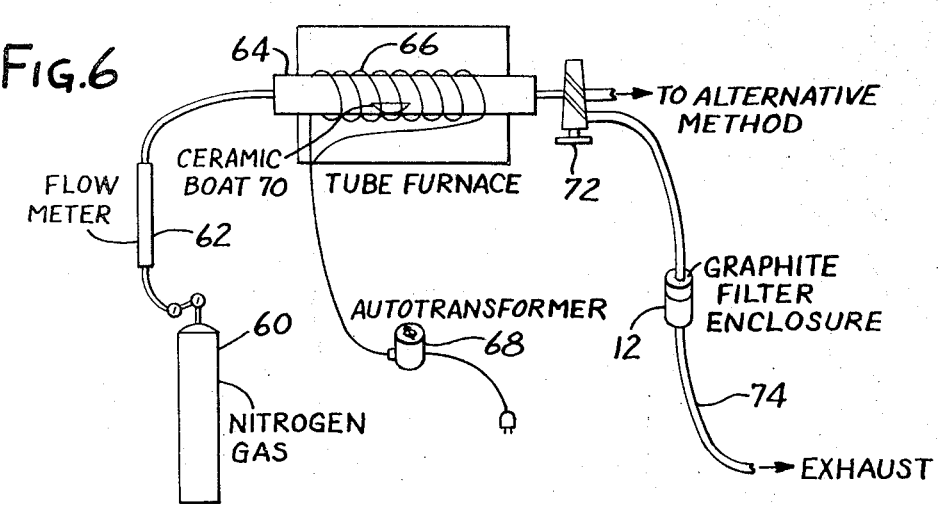

COMBINED SAMPLE COLLECTION AND VAPORIZATION SYSTEM FOR SPECTRO-CHEMICAL ANALYSIS

The present invention relates to spectro-chemical analysis, and particularly to a method and apparatus for determining the amount of a trace element in a fluid medium by employing a non-volatile filter device which forms the collector and holder for vaporization of the sample analyte. The present embodiment of the invention is herein described in connection with the filtration of particulate pollutants from samples of air and water and the quantitative determination of trace amounts of various elements present therein by flameless atomic absorption.

The use of nonflame methods for atomic absorption spectro-chemical analysis has become increasingly widespread in recent years as more applications of such techniques become known and recognized. Very great sensitivities may be obtained through these techniques using, for example, the graphite tube atomic absorption furnace, the sensitivity and precision of which have been demonstrated for a number of different elements. Although this and similar instruments have such great sensitivity, no sampling methods have been heretofore available which could readily be applied to such nonflame atomic absorption determinations to optimally take advantage of these capabilities.

Most filtration methods that might be employed have required either an ashing step or dissolution of the sample and/or filter medium, such as is described in the books by M. Katz, entitled Measurement of Air pollutants, World Health Organization, Geneva, 1969, and by W. Leithe, entitled The Analysis of Air Pollutants, Ann Arbor-Humphrey Science Publishers, Ann Arbor, London, 1970. For most other techniques of analysis this does not introduce substantial errors, but very large samples must be taken because of their relatively low sensitivity. However, furnace and other nonflame techniques are so sensitive that small volumes of air can be used and small amounts of the element of interest can be determined. Thus, under these circumstances, large errors are introduced by the pre-treatment of the sample which has been required to prepare it for analysis, and the high sensitivity capabilities of the nonflame techniques cannot be efficiently utilized to provide determinations which have an accuracy commensurate with such sensitivity.

Accordingly, it is an object of the present invention to provide sampling methods and apparatus which may be readily applied to nonflame atomic absorption determinations to utilize effectively the high sensitivity and precision capability of such determinations.

It is another object of the invention to provide an improved sample holder which may be advantageously employed in such sampling methods and apparatus.

These and other objects of the invention are more particularly set forth in the following detailed description and the accompanying drawings, of which:

FIG. 1 is a pictorial view showing an example of apparatus for collecting a sample in accordance with the practice of an embodiment of the present invention;

FIG. 2 is a sectional view showing the structure of a holder constructed in accordance with the principles of the invention;

FIG. 3 is a schematic diagram illustrating an arrangement of apparatus for spectro-chemical analysis employing the principles of an embodiment of the invention;

FIGS. 4 and 5 are sectional views showing alternative exemplary embodiments of enclosures which may be employed for containing the sample holder of FIG. 2 for sample collection as shown in FIG. 1;

FIG. 6 is a schematic diagram illustrating an arrangement of apparatus for performing a standardization technique in accordance with the practice of the invention;

Figure 7:
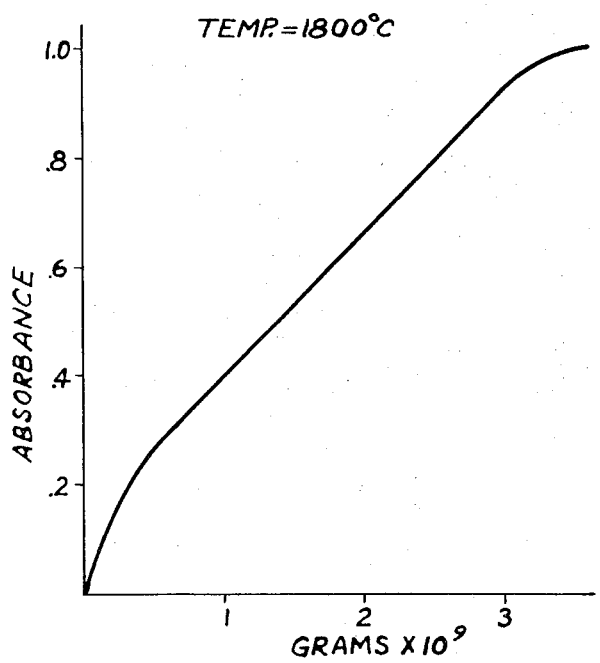
Figure 8:
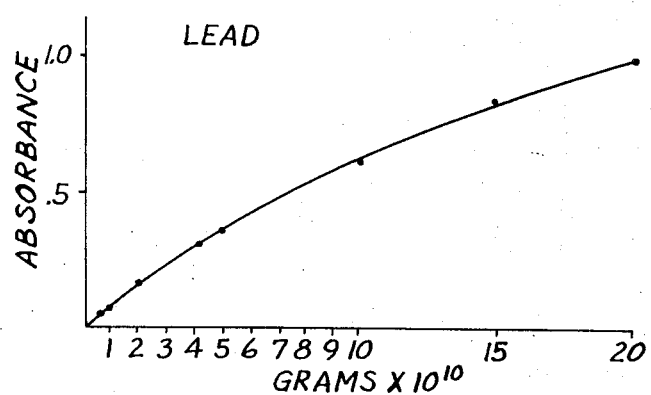

FIGS. 7 and 8 are exemplary graphical representations of the standard response of the apparatus of FIG. 3 for a known quantity of lead added as standard solutions; and FIGS. 9 through 12 are graphical representations illustrating various data obtained by the use of the apparatus of FIGS. 1 through 5 for determining praticulate lead pollutants in air samples which may be employed in an environmental pollution control program.

In general, the principles of the invention are utilized in the embodiments herein illustrated and described for the filtration of particulate pollutants from samples of air and water for the determination of trace amounts of various elements present, and particularly for the filtration of particulate lead pollutants in air so that the amount or concentration of lead present can be determined by flameless atomic absorption. However, the principles of the present invention are applicable to the determination of almost all elements in trace quantities which may be precipitated, suspended, or dissolved in a fluid medium. The present invention provides methods and apparatus for determining the amount of a given element in the particulates collected without further treatment which could introduce significant errors in the results.

Referring to FIG. 1, there is shown apparatus for performing a method of determining the amount of a trace element in a fluid medium, such as air, which comprises the steps of passing the air through a porous non-volatile filter 10, shown in FIG. 2, and which is contained in a filter enclosure 12 coupled to a forcing means 14, such as a syringe, through tubing 16 for drawing a known or predetermined quantity of air from the ambient or other medium to be sampled through the enclosure inlet port 18 and through the porous filter 10 so that the trace element from the fluid medium is collected by the filter from the medium. The medium to be sampled is thus drawn through the system in the direction of the arrow by extending the syringe the predetermined measured amount. The tubing 16 which couples the syringe 14 to the enclosure 12 is connected to an outlet port 20 and is preferably made as short as possible. The construction of the filter enclosure 12 will be described in detail hereinafter.

After the trace element is collected by the filter 10, it is placed in a nonflame heating means, illustrated as furnace 22 in FIG. 3, which vaporizes the trace element from the filter 10. The amount of vaporized trace element is measured by spectro-chemical analysis, and particularly by a nonflame atomic absorption method through electrothermal atomization by the apparatus schematically diagrammed in FIG. 3. A reference light source, such as hollow cathode 24, directs a beam of light having a wavelength which is the same as the resonance or absorption wavelength of the trace element being measured along an optical axis 26 which passes through the furnace 22 and is received by a conventional spectrophotometer 28 coupled to any suitable read-out means, such as meter 30, to measure the amount of absorption of the reference light source produced by the presence of the vaporized or gaseous trace elements evolved from the filter 10 which serves as the sample holder for the vaporization process. The trace element vapor rises to intercept the optical axis 26, and it is immaterial whether the axis passes over the sample holder or through it by means of suitable openings or apertures in the holder walls, so long as there is an interception of the vapor with the light beam.

Referring now to FIG. 2, the sample holder and filter 10 in the illustrated embodiment is generally cup-shaped and composed of a porous material which is non-volatile and relatively inert with respect to the method employed in the spectro-chemical analysis and at the vaporization temperature of the trace element being measured. A preferred material is microporous graphite, but other suitable materials, such as tantalum or iridium metals or ceramics such as ziconia or thoria, with appropriate porosities induced, may be employed. The graphite cup or crucible illustrated is of the general shape or geometry used for carrier distillation, ASTM No. S-3, and a grade of graphite designated Spectro XA-3 fabricated at Poco Graphite Inc., P. O. Box 2121, Decatur, Texas 76234, was found satisfactory. This graphite had a density of 0.94 to 0.96 gm/cc with impurities of less than 2 parts per million. It is believed that this graphite contains a network of relatively large pores (termed induced or functional porosity) in a graphite matrix which contains smaller pores (termed the incidental porosity). The mean diameter of the former or induced porosity is 1.4 microns, while that of the latter incidental porosity is 0.4 microns. The volume percent porosity is 55.3 percent and the larger pores are interconnected to the extent of about 96 percent. This graphite is of the type developed to be used as electrodes in diffusion fuel cells and is described in greater detail in articles by Swinkels and Seefurth, J. Electrochem. Soc., Vol. 115, Page 994 (1968) and by Reed and Brodd, Carbon, Vol. 3, Page 241 (1965).

In general the material should have a porosity and other properties so that it can collect the trace elements from the fluid medium by filtration or adsorption and withstand the subsequent volatilization of the trace elements without being volatilized itself. The sample fluid medium may of course contain the trace elements in precipitated, suspended, or dissolved form in gases or liquids, as a general matter. Thus, the material should have a mean pore diameter no greater than the diameter of the largest particles to be collected and a high degree of internal surface area for good adsorption. The mean pore diameter will generally be no greater than 100 microns, and will typically be substantially smaller because it is necessary to permit the fluid to pass through the material during collection, leaving the trace elements within the filter material and on its filter surfaces, while the fluid is then discarded. On the other hand, the mean pore diameter should be sufficiently large so that the fluid medium can be passed through the material. Thus, smaller pore sizes can generally be used with air or other gaseous media than with most liquids where the surface tension or other cohesive forces may limit the minimum or smallest mean pore diameter that can be practicably used.

The particular shape of the cup (and of the enclosure 12) will of course depend on the nature of the instrument to be used for subsequent analysis. In the present embodiment, the cup 10 has a right circular cylindrical shape with a relatively thicker end portion 32 for an axially located threaded bore 34 adapted to receive a rod-like handle 36. The handle 36 has a mating threaded portion at the end thereof and is used for insertion of the cup 10 into the furnace 22, as shown in FIG. 3. For some applications, merely a disc could be used. Also, of course, other diverse shapes may be employed having suitable apertures for alignment with and passage of the optical path or for various supporting members or electrodes for heating and atomization of the trace element within the cup.

Referring now to FIG. 4, there is shown a sectional detailed view of the filter enclosure 12 depicted in FIG. 1, which comprises two threadedly engageable sections 40 and 42 having respectively aligned inlet and outlet ports 18 and 20 within the respective stem portions 48 and 50 of the sections 40 and 42. The section 40 has a flange portion 52 which, together with the internal surface of the section 42, defines a chamber for holding or containing the sample cup 10 in a condition suitable for collection of a sample through the inlet port 18. One or more grooves 53 are formed in the upper bore portion of the section 42 to serve as a by-pass for the fluid which has been filtered through the walls of the cup 10. Suitable O-rings, as shown, may be employed to assure a good seal so that communication, and thus fluid flow, between the inlet port 18 and the outlet port 20 must necessarily take place through the material of the sample cup 10. Although the enclosure assembly may be composed of any suitable plastic, it is preferably made from Teflon. Teflon is preferred as a body material because it can be soaked in a number of acids without fear of damage and it exhibits no memory effects in use. Another advantage in using Teflon is that the threads will generally be self-sealing, so that the O-ring between the sections 40 and 42 may be eliminated. The illustrated filter enclosure was machined from ¾ inch diameter Teflon bar stock. Of course, it may be made in any other suitable and conventional fashion.

Figure 5:
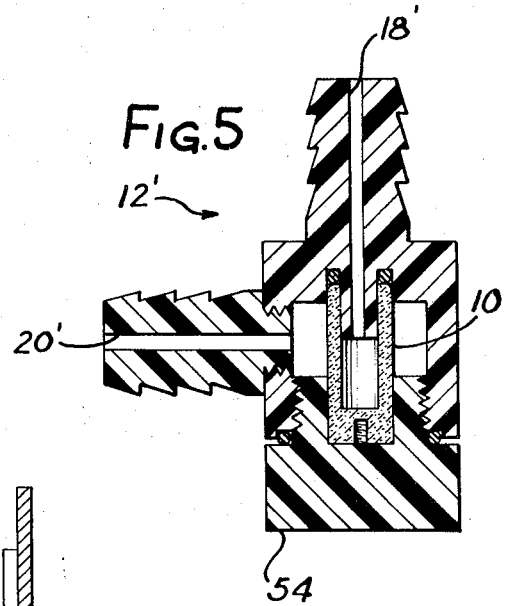

An alternative filter enclosure construction 12' is illustrated in FIG. 5 wherein the inlet port 18' and the outlet port 20' are disposed at right angles and the chamber containing the sample cup 10 is closed by a cap threadably engaged with the main body section. The enclosure 12' is also preferably made of Teflon.

In the use of either of the filter enclosures, 12 and 12', the trace elements from the fluid medium will be adsorbed and coated on the inner bottom as well as the side walls of the sample cup 10; however, the use of the enclosure 12 should result in a more uniform build-up on the inner surfaces.

In use and operation, the graphite crucible or cup 10 is placed in the Teflon enclosure and 100 to 500 cc of air is drawn through it using the plastic disposable syringe 14 attached to the outlet stem 50 with a short length of surgical tubing 16. No air seepage was detected either at the Teflon threaded connections or at the surgical tubing connector by immersing the unit under water and applying pressure to it. The amount of lead in the crucible is then determined by inserting it into the graphite tube furnace 22 with an internal temperature of 1,800°C. and recording the absorbance from the read-out meter 30. The internal furnace temperature of 1,800°C. is believed to be an optimum temperature for spectro-chemical absorption determinations for lead. For these determinations a technique for background absorbance correction like that described by Woodriff and Shrader, in Anal. Chem., Vol. 43, Page 1918 (1971), was used to determine if there were any interferences due to broad band absorption or scattering. No such interferences were found to be present in air samples.

The spectrophotometer 28 utilized Glan-Taylor polarizers which absorb in the 217nm region, so the 283.3nm line was used and was emitted by the hollow cathode light source 24. An increase in sensitivity may be achieved with the use of a single channel chopped source and a phase-lock amplifier.

An arrangement of apparatus for achieving some type of standardization is illustrated in FIG. 6 wherein nitrogen gas is supplied under pressure from tank 60, through a flow meter 62 and tube furnace 64 which is maintained at a known set temperature by an electric heater 66 energized by an adjustable autotransformer 68 so that a known calculated amount of lead is vaporized into the nitrogen from the ceramic boat 70 containing a lead nitrate solution. The nitrogen gas, which was selected because of its similarity to air, carries the lead from the furnace 64, through a valve arrangement 72 and through the graphite filter enclosure 12 by means of suitable tubing. The lead is collected by the graphite sample holder and filter cup 10 within the enclosure 12, while the nitrogen is exhausted and discarded through the outlet tubing 74. Thus, limited essentially only by the ability to calculate the amount of lead vapor being generated from the ceramic boat 70, the effectiveness of the graphite filter cup 10 may be determined for any particular time duration by removing the cup from the enclosure 12 and inserting it into the furnace 22 (FIG. 3) for vaporization and spectro-chemical analysis.

As shown in FIG. 6, the valve arrangement 72 permits the output or exhaust from the furnace 64 to be coupled to some other device to provide an alternative method of collection, such as, for example, some standard well known technique against which a comparison can be made. For example, the alternative method outlet port of the valve 72 may be connected with suitable tubing to a so-called Swinny type adapter enclosure used in conjunction with the well known Millipore filters. Of course, an advantage of the porous graphite used in accordance with the principles of the present invention is that it can be used for the filtration and the spectro-chemical determination without transfer from one media or container to another.

Referring now to FIGS. 7 and 8, there are shown standard curves which were derived by adding lead to the graphite crucibles as lead nitrate solutions, and employing standard solution concentrations. Using the apparatus of FIG. 3, the absorption was plotted for known amounts or concentrations of lead. By employing the aforementioned type of furnace 22, the chemical matrix effects are minimized and (within experimental error) the response for a given quantity of lead does not vary regardless of its chemical nature. The curve plotted in FIG. 7 was initially made, and was then replaced by a later curve graphed in FIG. 8 which is believed to provide somewhat greater accuracy and broader range for lead concentrations in air. The curve of FIG. 7 was derived from data obtained with the aforementioned background correction, while the curve of FIG. 8 was derived from data obtained through the use of a chopped light source and phase-lock amplifier at 217nm. However, of course, a standardizing curve may be developed for any other particular element in any particular fluid medium in accordance with the teachings herein, used in conjunction with the well known and conventional standardizing techniques for spectrochemical analysis.

Using the standardizing curves of FIGS. 7 or 8, plots of the variation of the concentration of lead in the atmosphere as a function of time and at particular locations can be seen from FIGS. 9 through 12. FIG. 3 depicts the lead concentration (in micrograms per cubic meter) for samples taken on the Montana State University campus during a week of final examinations, and therefore traffic was not very heavy. The winds were out of the West at about 5 mph and the temperature was about 75°F. It can be seen from the figures that the levels of lead were rather low in the morning, averaging 0.1 micrograms per cubic meter, but were generally higher in the afternoon with sharp increases at 3:05, 4:30 5:00 and 5:30. These levels are generally consistent with the traffic flows that were observed.

Figure 10:
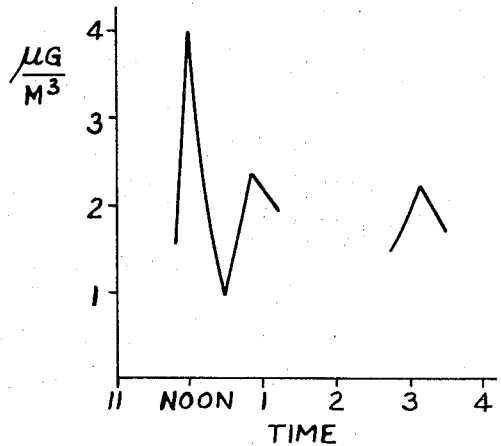

FIG. 10 was taken at the location of North Seventh Avenue and Main Street in Bozeman, Montana. Traffic from Interstate Highway 90, as well as traffic going to Yellowstone National Part must pass this point. Samples were taken on a sunny, calm and dry day. Again, the levels of lead are consistent with observed traffic flows. Samples were taken during noon hour rush, and there are noticeable increases in the lead concentrations at 12:00 and 12:50.

Figure 11:
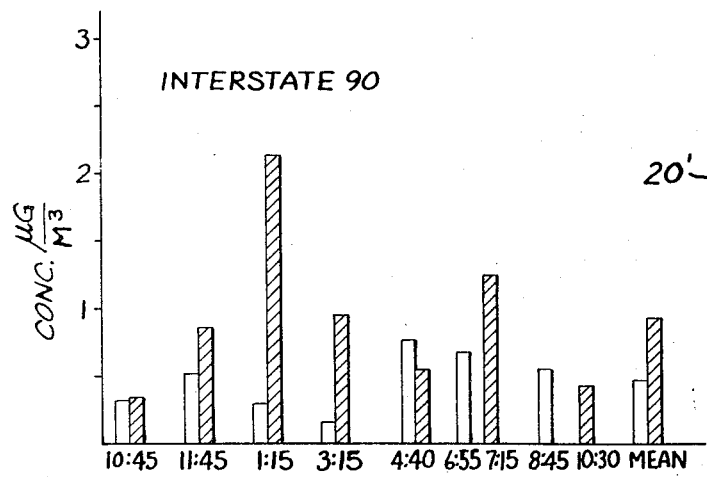

Likewise, the bar graph in FIG. 11 shows the lead concentration present at a given location on Interstate Highway 90 at different times throughout a particular day. The concentrations represented by the white bars are for a day prior to the opening of the highway to public use, while the cross-hatched bars represent the concentrations on a day after the highway was opened for public use. Again, it is apparent that the lead concentration measured at that location on the highway bore a positive and direct correlation with the amount of traffic on the highway.

Figure 12:
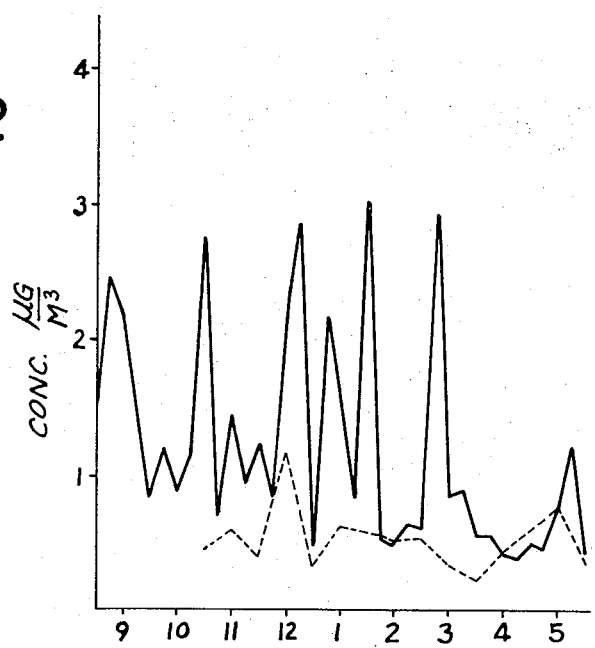
Figure 9:
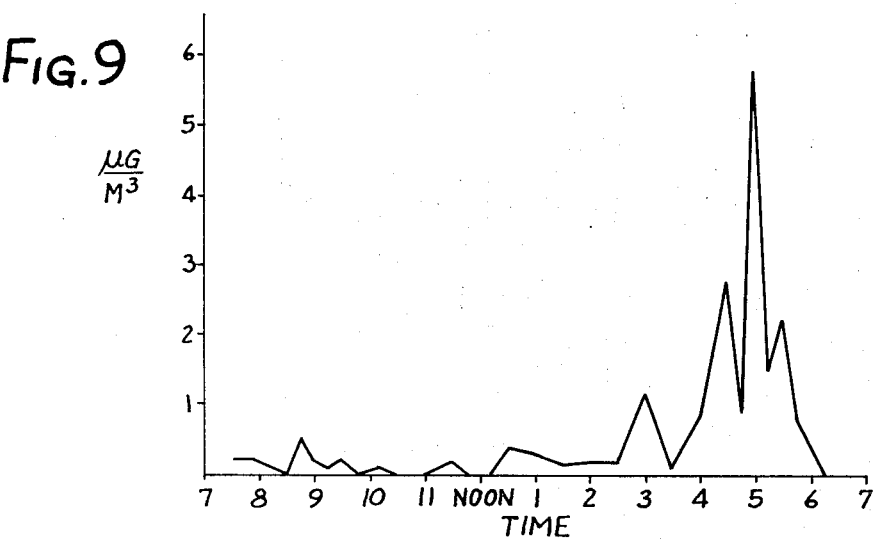

FIG. 12 is still another graphical representation showing the lead concentration on campus as a function of the time of day during summer vacation and during the school term, the former being indicated by broken line. As can be seen, the lead concentration was substantially higher during the active portion of the year, when there was heavy traffic as compared to the relatively inactive time of year during the school vacation. It is noteworthy with respect to the sensitivity of the present technique that the results clearly show peaking at the hourly class intervals during the school term. Even during the summer vacation, peaking is still observed during the heavy traffic periods.

The sensitivity of the presently described method, based on a scale deflection of 1%, was estimated at approximately $5 \times 10^{+12}$ grams per sample, and later calculations show a sensitivity of $2.5 \times 10^{+12}$ grams per sample. Experiments with the standardization technique employing the apparatus of FIG. 6 have resulted in a coefficient of variation of 1.2 percent.

Thus, as can be seen, the principles of the present invention may be applied advantageously in making determinations of air and water qualities, and are particularly useful in environmental control and improvement programs. The small size, lightweight, and ease of use makes the porous sample holder and enclosure of the present invention ideal for sampling in the field or at sites remote from the laboratory. Because the method of the present invention does not require sample processing which would contaminate the sample, its use with the highly sensitive flameless atomic absorption technique makes it useful for sampling in remote places, such as in the wilderness, where the concentration of particulate in the atmosphere is extremely low. Further, the present method of sampling is useful for most particulate impurities found in the atmosphere, within the limits of the sensitivity of the spectro-analysis instrument and the size of the particles.

In the field, the graphite crucible or other sample holder constructed in accordance with the present teachings can be stored in a titanium holder or container kept within a dessicator until its use for sample collection and then until the spectrographic determinations can be made. Titanium was employed since it can be soaked in dilute nitric acid for cleaning purposes. In this matter, the sample holders can be kept for at least a day.

Although the illustrated and preferred embodiment of the invention uses a spectro-chemical determination made by nonflame atomic absorption by furnace vaporization, and particularly by the type of furnace described by Woodriff et al., Applied Spectroscopy, Vol. 24, No. 5, Sept./Oct. 1970, Page 530–533, wherein the sample is maintained in an inert atmosphere, other spectrographic methods of determination may alternatively be employed. Also, other nonflame heating devices may be employed for vaporizing the trace elements from the sample holder, such as a carbon rod atomizer or other apparatus employing direct resistance heating of the sample holder, such apparatus being particularly suited for use with the porous graphite cup hereinbefore described due to its inherent conductivity characteristics.

Although a preferred embodiment of the present invention has been illustrated and described, various modifications thereof will be apparent to those skilled in the art; accordingly, the scope of the present invention should be defined only by the appended claims, and equivalents thereof.

Various features of the invention are set forth in the following claims.

What is claimed is:

1. A method for determining the amount of a trace element in a fluid medium comprising the steps of passing the fluid medium through a non-volatile solid filter composed of relatively inert microporous material so that the trace element from the medium is collected by the filter, furnace-heating said filter in an inert atmosphere to vaporize the collected trace element without significant volatilization of said filter material, and measuring the amount of said vaporized trace element by non-flame atomic spectro-chemical analysis employing electrothermal atomization.

2. The method of claim 1 wherein said filter is cup-shaped and the trace element from the fluid medium is collected on the inside of the filter cup.

3. The method of claim 1 wherein the microporous material of said filter is selected from the group consisting of graphite, tantalum, iridium, zirconia and thoria.

4. The method of claim 1 wherein said material is graphite.

5. The method of claim 1 wherein said method measures the absorption of the vaporized trace element.

6. The method of claim 1 wherein said passing of the fluid medium through the filter comprises the steps of containing said filter in a chamber of a holder made of an inert material to prevent contamination, said holder completely enclosing the filter except for an inlet and outlet port communicating with said chamber and forcing said medium into said inlet port while exhausting said chamber through said outlet port to pass a predetermined quantity of said medium through the filter.

7. The method of claim 1 wherein said medium is air and said trace element is in the form of lead particulates suspended or dissolved therein.

8. Apparatus for determining the amount of a trace element in a fluid medium by spectro-chemical analysis, comprising a solid filter for collecting the trace element, said filter being composed of a non-volatile relatively inert microporous material, a furnace including said filter for vaporizing the collected trace element directly from said filter without significant volatilization of said microporous material, and means for spectroscopially measuring the emission or absorption of said vaporized trace element.

9. The apparatus of claim 8 wherein the microporous material of said filter is selected from the group consisting of graphite, tantalum, iridium, zirconia and thoria.

10. The apparatus of claim 8 wherein said microporous material is graphite with a mean pore diameter no greater than 100 microns.

11. The apparatus of claim 8 further comprising means for passing said medium through said filter for collection of said trace element.

12. The apparatus of claim 11 wherein said means comprises a filter enclosure having a chamber for containing said filter, and inlet and outlet ports communicating with said chamber, and means for introducing a predetermined quantity of said medium into said chamber through said inlet port while exhausting said medium therefrom through said outlet port.

13. The apparatus of claim 12 wherein said introducing means comprises a syringe connected to said outlet port.

14. The apparatus of claim 8 wherein said filter is cup-shaped.

* * * * *